UNITED STATES PATENT OFFICE.

FRIEDRICH BERGIUS, OF HANOVER, GERMANY.

PROCESS OF MAKING ALKALI-EARTH PEROXID.

1,015,286.   Specification of Letters Patent.   Patented Jan. 23, 1912.

No Drawing.   Application filed April 11, 1911. Serial No. 620,402.

*To all whom it may concern:*

Be it known that I, FRIEDRICH BERGIUS, a citizen of the German Empire, residing at Hanover, Germany, have invented certain new and useful Improvements in Processes of Making Alkali-Earth Peroxid, of which the following is a specification.

This invention relates to the preparation of the super-oxids of the alkali earths by processes in which the corresponding oxid is heated in a current of air or oxygen. In the preparation of barium peroxid for example, a somewhat complicated process has been hitherto adopted. To obtain a product containing a high percentage of the peroxid the nitrate was raised to the glowing heat at a very high temperature and the oxid obtained in this manner converted into the peroxid at a lower temperature. This method is not a rational one because the nitric acid in combination with the barium is completely decomposed by the high temperature into nitrogen and oxygen and also because a much higher temperature has to be used for the preparation of the oxid than is necessary for the subsequent oxidation into the peroxid. The reason for the deviation thus described lies in the fact that to obtain a product with a high percentage of peroxid the oxid must be in a very porous condition as otherwise each particle of the oxid is given an outer layer of peroxid which protects the inside of the particle from further oxidation.

The object of this invention is to overcome the above difficulty and it consists in a process of the type referred to in which the oxid is dissolved in a relatively inert substance, such as an alkali for example in molten condition, and the air or oxygen passed through the molten product, under pressure when necessary.

The invention also consists in separating out from the molten product the super-oxid which has been produced, by washing the molten product after cooling in a relatively inert solvent such as alcohol.

The preferred solvents for the oxid are the caustic alkalis, which have a considerable dissolving action on the oxids of the alkali earths at a somewhat low melting point.

In carrying out the process, the barium oxid for example, is dissolved in melted caustic soda and a stream of oxygen is passed through the melted product until the barium oxid is completely oxidized into the peroxid. In the manufacture of such super-oxids, for example, super-oxid of calcium, as appreciably dissociate slightly above the melting point of the solvent, the process is conducted in such manner that the conversion into super-oxid takes place in a current of oxygen under elevated pressure, preferably about 100 atmospheres. After cooling of the molten mass it is treated with alcohol or a similar solvent in order to dissolve the caustic soda, the super-oxid which is insoluble being left. The alcohol may be separated from the caustic soda by distillation and both substances may be again used for the process.

The following is a practical example. 100 lbs. of caustic soda are melted in an iron crucible and raised to a temperature of about 350° C. 15 lbs. of barium oxid are then stirred in and after the oxid has been thoroughly dissolved, a current of oxygen is passed through the molten liquid. Fresh barium oxid is stirred in as the barium oxid already in the molten mass becomes converted into insoluble peroxid. When the oxidation is finished, the deposit is separated from the molten mass and washed in alcohol or similar inert solvent for caustic alkali, in order to remove any alkali contained by the said deposit of super-oxid.

What I claim is:

1. Process for the preparation of super-oxids of the alkali earths, consisting in oxidizing the oxids of the alkali earths when dissolved in a molten inert substance.

2. Process for the preparation of super-oxids of the alkali earths, consisting in oxidizing the oxids of the alkali earths when dissolved in an alkali in molten condition.

3. Process for the preparation of super-oxids of the alkali earths, consisting in oxidizing the oxids of the alkali earths when dissolved in a molten inert substance by passing a gas containing free oxygen through the molten product.

4. Process for the preparation of super-oxids of the alkali-earths, consisting in oxidizing the oxids of the alkali earths when dissolved in a molten inert substance, and separating the super-oxid by allowing the molten mass to cool and then washing it with an indifferent solvent agent.

5. Process for the preparation of super-oxids of the alkali earths, consisting in oxidizing the oxids of the alkali earths when dissolved in a molten substance, and separating the super-oxid by allowing the molten mass to cool and then washing it with alcohol.

6. Process for the preparation of super-oxids of the alkali earths, consisting in oxidizing the oxids of the alkali earths when dissolved in a molten inert substance by treating the molten product with a gas containing free oxygen, under elevated pressure.

In testimony whereof, I affix my signature in presence of two witnesses.

FRIEDRICH BERGIUS.

Witnesses:
ERNEST C. OBERHOLTZER,
MARTA L. THOMPSON.